(12) United States Patent
Breunig

(10) Patent No.: US 6,206,442 B1
(45) Date of Patent: Mar. 27, 2001

(54) GLOVE COMPARTMENT IN THE INSTRUMENT PANEL OF A MOTOR VEHICLE AND METHOD OF MAKING SAME

(75) Inventor: Steffen Breunig, Elztal (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/102,042

(22) Filed: Jun. 22, 1998

(30) Foreign Application Priority Data

Jun. 20, 1997 (DE) .............................................. 197 27 690

(51) Int. Cl.[7] ...................................................... B60R 7/06
(52) U.S. Cl. ........................ 296/37.12; 296/208; 296/70
(58) Field of Search ................................ 296/37.12, 208, 296/70, 37.8, 37.16; 180/90

(56) References Cited

U.S. PATENT DOCUMENTS

| | | | |
|---|---|---|---|
| 4,752,096 | * 6/1988 | Ishikawa | 296/37.16 |
| 4,892,138 | 1/1990 | Bibik, Jr. . | |
| 4,902,061 | * 2/1990 | Plavetich et al. | 296/37.12 |
| 5,263,346 | * 11/1993 | Sato et al. | 296/37.12 |
| 5,289,962 | * 3/1994 | Tull et al. | 296/37.12 |
| 5,441,326 | * 8/1995 | Mikalonis | 296/208 |
| 5,558,385 | * 9/1996 | Gross et al. | 296/37.12 |
| 5,618,018 | * 4/1997 | Baniak | 296/37.12 |

FOREIGN PATENT DOCUMENTS

| | | |
|---|---|---|
| 4444943A1 | 6/1996 | (DE) . |
| 0707991A1 | 4/1996 | (EP) . |

OTHER PUBLICATIONS

Search Report Sep. 10, 1998, United Kingdom.

* cited by examiner

Primary Examiner—Joseph D. Pape
(74) Attorney, Agent, or Firm—Evenson, McKeown, Edwards & Lenahan, P.L.L.C.

(57) ABSTRACT

A glove compartment in the instrument panel of a motor vehicle has a housing closable by a lid. The installation of the glove compartment in the instrument panel of the motor vehicle involves locating the glove compartment at an air outlet nozzle, insertable into the instrument panel, of a ventilation or air conditioning device of the motor vehicle.

24 Claims, 6 Drawing Sheets

GLOVE COMPARTMENT IN THE INSTRUMENT PANEL OF A MOTOR VEHICLE AND METHOD OF MAKING SAME

BACKGROUND AND SUMMARY OF THE INVENTION

This application claims the priority of German application 197 27 690.3-21, filed Jun. 20, 1997, the disclosure of which is expressly incorporated by reference herein.

The invention relates to a glove compartment in the instrument panel of a motor vehicle with a housing closable by a lid. A glove compartment of this type, because of its dimensions, is preferably used for storing glasses, vehicle documentation, cellular telephones, or the like.

An insert that can be pulled out like a drawer is known from German Patent Document DE 44 44 943, said insert being designed for example as a beverage holder or as a storage compartment, and is provided for installation in the instrument panel of a motor vehicle. This known storage compartment consists of a large number of parts that must be installed in the instrument panel, so that its installation is cumbersome and requires considerable time.

The present invention is concerned with the problem of making the installation of a glove compartment in the instrument panel of a motor vehicle more efficient and/or simpler.

This problem is solved according to the invention by a glove compartment arrangement for an instrument panel of a motor vehicle comprising a housing closable by a lid, wherein the glove compartment is located at an air outlet nozzle of a ventilation or air conditioning device of the motor vehicle and forms an assembly that can be inserted therewith into the instrument panel.

The invention is based on the general idea of reducing the number of parts that must be installed when assembling the instrument panel, especially in a motor vehicle. If the glove compartment is located at the air outlet nozzle according to the invention, it is installed when the ventilation or air conditioning device is assembled. If the ventilation or air conditioning device is retrofitted, it is installed in the instrument panel as an assembly together with the glove compartment in a single work step.

This integration of the glove compartment in the vicinity of the air outlet nozzle results in especially advantageous design possibilities of certain preferred embodiments wherein a lid and an air outlet nozzle are framed by a common frame. This integration of the glove compartment in the vicinity of the air outlet nozzle results in especially advantageous design possibilities of certain preferred embodiments wherein an outside of the lid has a strip structure that conforms to an outside of the air outlet nozzle.

With the aid of these measures, the glove compartment and/or its cover can be integrated into the structure of the instrument panel in such fashion that it can no longer be recognized as such from outside. Since the middle nozzles of the ventilation or air conditioning device are located approximately in the center of the instrument panel in most motor vehicles, the glove compartment can preferably be located at this nozzle. If the lid and the middle nozzle each have the same external structure, the lid contour fits completely into the contour of the middle nozzle and cannot be recognized as a lid. This is especially important when the outside of the nozzle has ventilation slots designed as strips, since the transition between the middle nozzle and the lid can be provided between two strips and will thus be invisible from outside.

As a result of the proposed common frame around the glove compartment and the air outlet nozzle according to certain preferred embodiments, the glove compartment and/or its lid become fully integrated visually into the contour of the nozzle. Since the frame characterizes the transition between the instrument panel and the nozzle, a person who was not previously informed would perceive the lid as part of the middle nozzle and would not assume that it was a cover for a glove compartment.

Other objects, advantages and novel features of the present invention will become apparent from the following detailed description of the invention when considered in conjunction with the accompanying drawings.

DETAILED DESCRIPTION OF THE DRAWINGS

Figure 1:
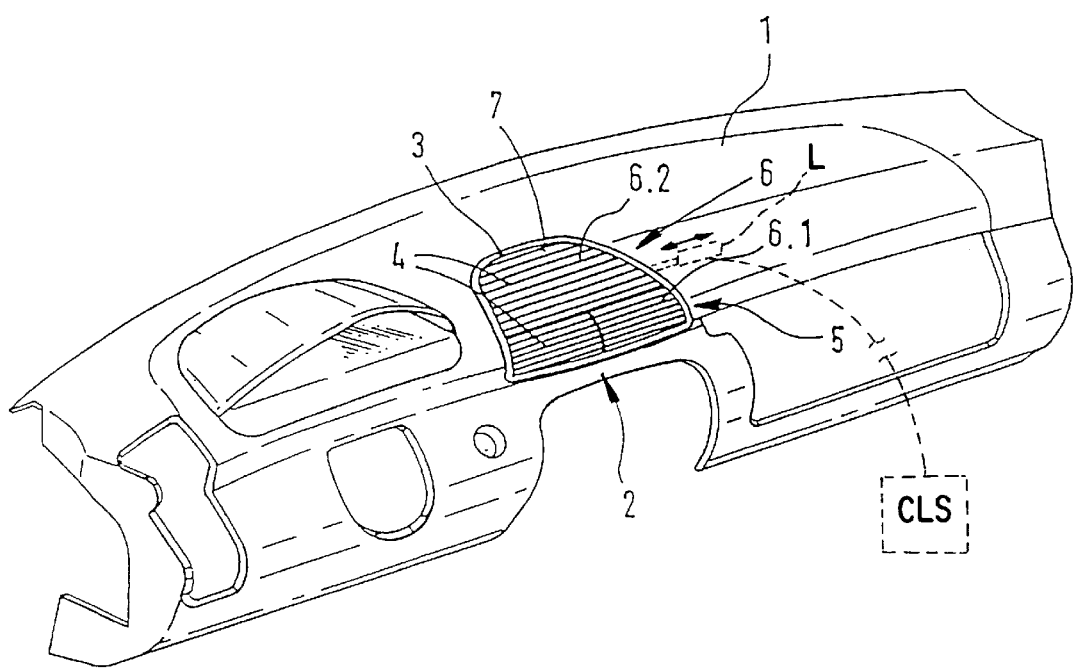
FIG. 1 is a perspective schematic view of an instrument panel with a middle nozzle, with a glove compartment integrated according to the invention.

According to FIG. 1, an instrument panel 1 has an air outlet nozzle 2 of a ventilation or air conditioning device not shown in further detail located in its middle area, said nozzle being referred to hereinbelow as middle nozzle 2. This middle nozzle 2 is enclosed by a frame 3 that sets it off visually from instrument panel 1. Middle nozzle 2 has ventilation slots that run parallel to one another on its exterior and are designed as strips 4A, 4B.

Middle nozzle 2 is divided visually into two areas. A first area 5, the lower area in FIGS. 1 and 2, has strips 4A whose inclination can be adjusted in order to regulate the air flow to match the desires of the occupants. This lower area 5 is additionally divided into a left and a right area, one of which is associated with the driver and the other with the passenger. In contrast thereto, strips 4B, 4B are not adjustable in an area 6 of middle nozzle 2 that is at the top in FIG. 1. This area 6 thus contains a nonadjustable outlet opening whose strips $4B^1$ produce an air flow into the middle of the motor vehicle interior.

The visually uniform upper area 6 of middle nozzle 2 is also divided functionally into two areas. The lower area 6.1 in FIG. 1 is associated with middle nozzle 2 and forms the abovementioned nonadjustable outlet opening for the air stream. In contrast thereto, the adjoining upper area 6.2 forms a lid 7 that cannot be recognized as such in FIG. 1.

Figure 2:
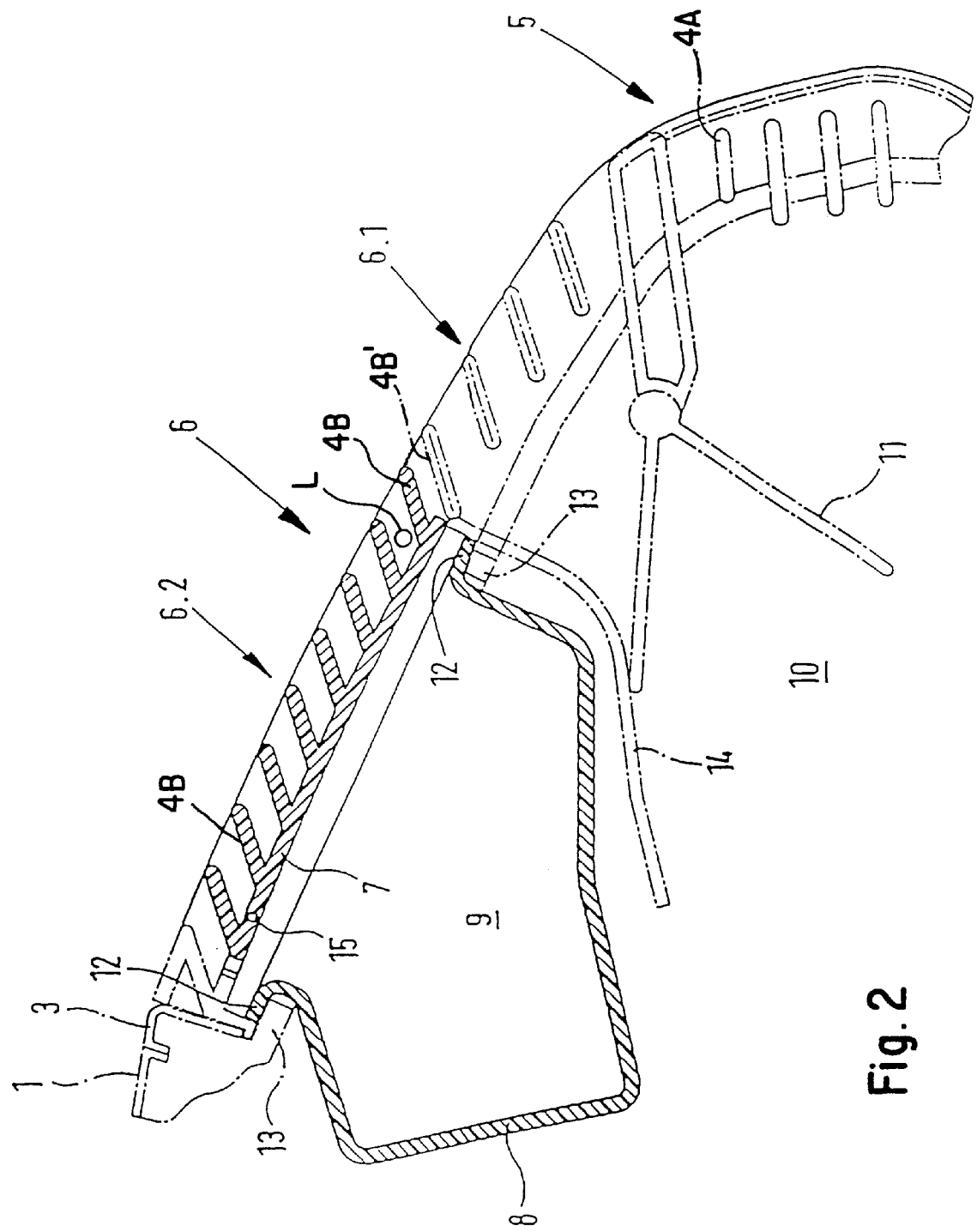
FIG. 2 is a sectional through a glove compartment with the cover closed constructed according to preferred embodiments of the invention.

For greater clarity, this lid 7 is shown in a sectional view in FIG. 2. In the view shown, lid 7 closes a housing 8 of a glove compartment 9 that is accommodated in instrument panel 1. Glove compartment 9 is then associated as shown in FIG. 2 with middle nozzle 2 above a corresponding air supply 10. A deflector 11 for controlling the air stream is provided in this air supply 10.

Housing 8 is provided on its open side with a circumferential collar 12 that rests on a matching support 13 on instrument panel 1 and/or on the ventilation or air-conditioning system and can be joined with the latter for example by welding, gluing, or clipping. On the side of housing 8 that faces air supply 10 of middle nozzle 2, the housing is protected by a flow guide plate 14 against the direct impact of hot air.

Lid 7 is mounted so that it can pivot on frame 3 of middle nozzle 2 around an axis 15 that extends in the plane of instrument panel 1 in the vicinity of its end which is the upper end in FIG. 2.

It is readily apparent from FIG. 2 that because the spaces between adjacent strips 4B remain constant in the entire upper area 6 of the middle nozzle, no upper or lower contour of lid 7 can be seen from outside. The lateral contour, as can be seen from FIG. 1, is integrated by the surrounding frame 3 into the visual appearance of middle nozzle 2.

Figure 3:
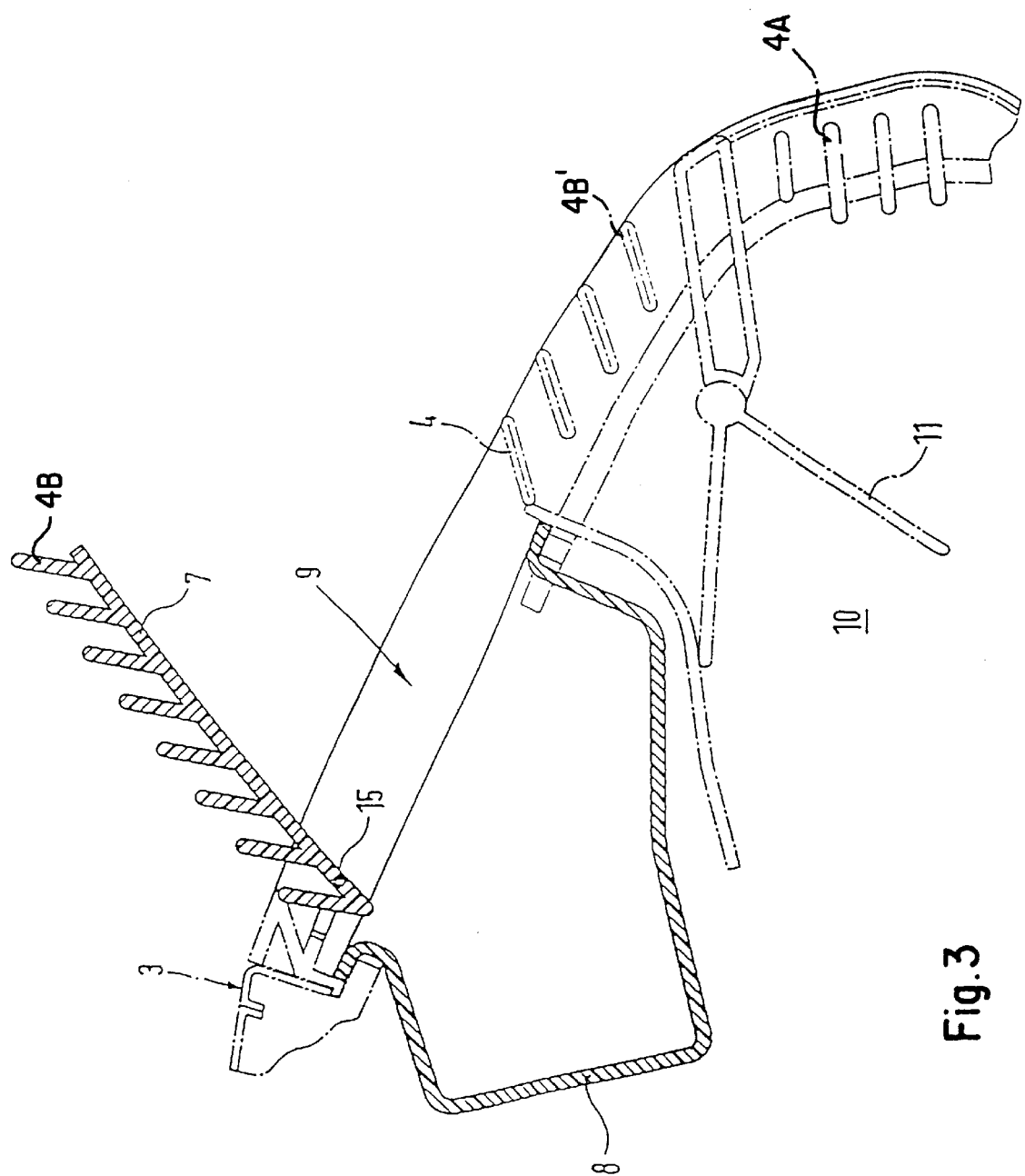
FIG. 3 is a sectional view through the glove compartment of FIG. 2 with the cover open.

While FIG. 2 shows lid 7 closed, lid 7 in FIG. 3 is shown in an open position. Glove compartment 9 and/or the interior of its housing 8 is thus accessible and can serve to store a variety of objects, for example glasses, change, a cellular telephone, vehicle documentation, and the like.

Figure 4:
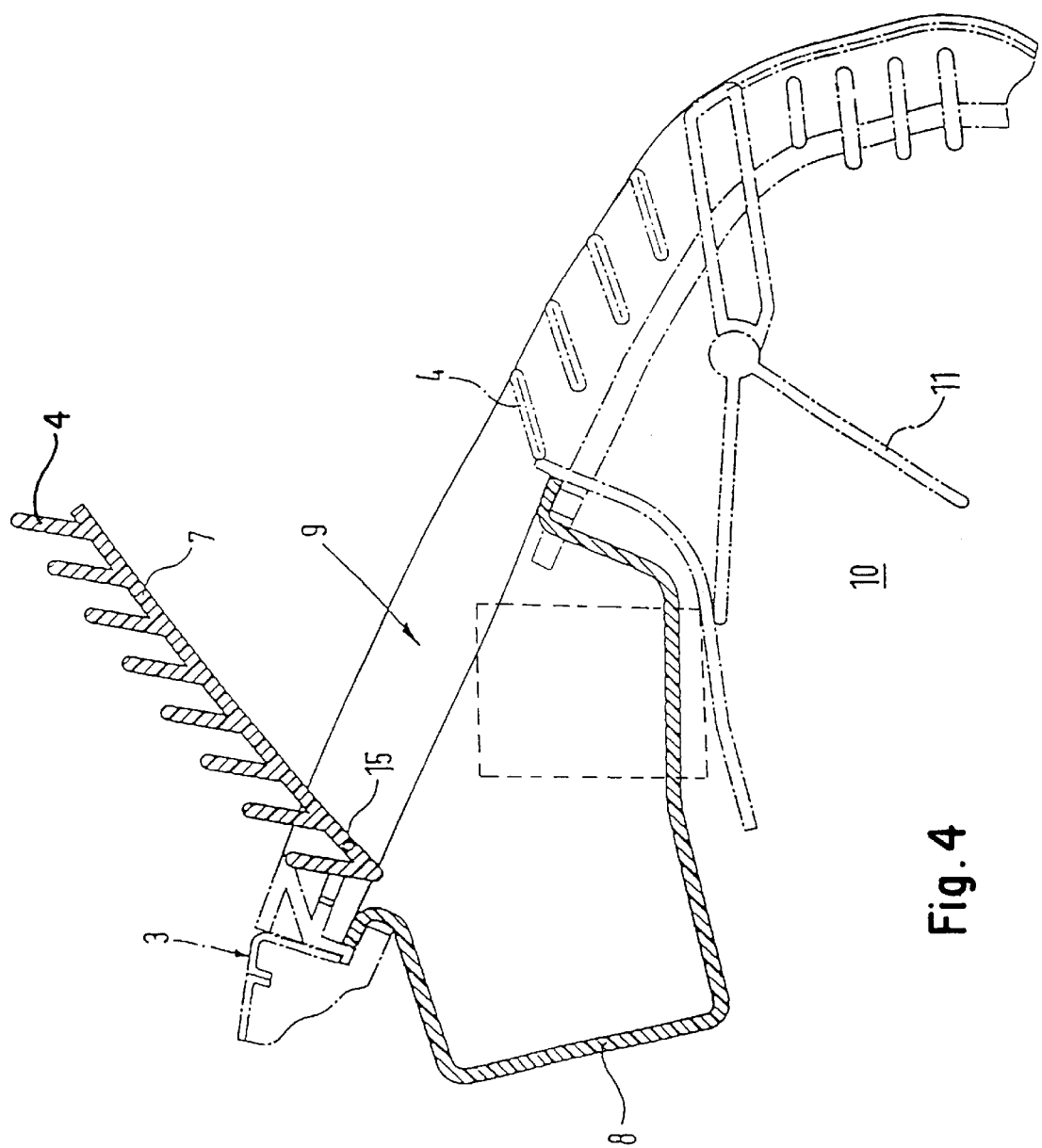
FIGS. 4 and 5 are views similar to FIG. 3 showing variations of another embodiment of the invention.
Figure 5:
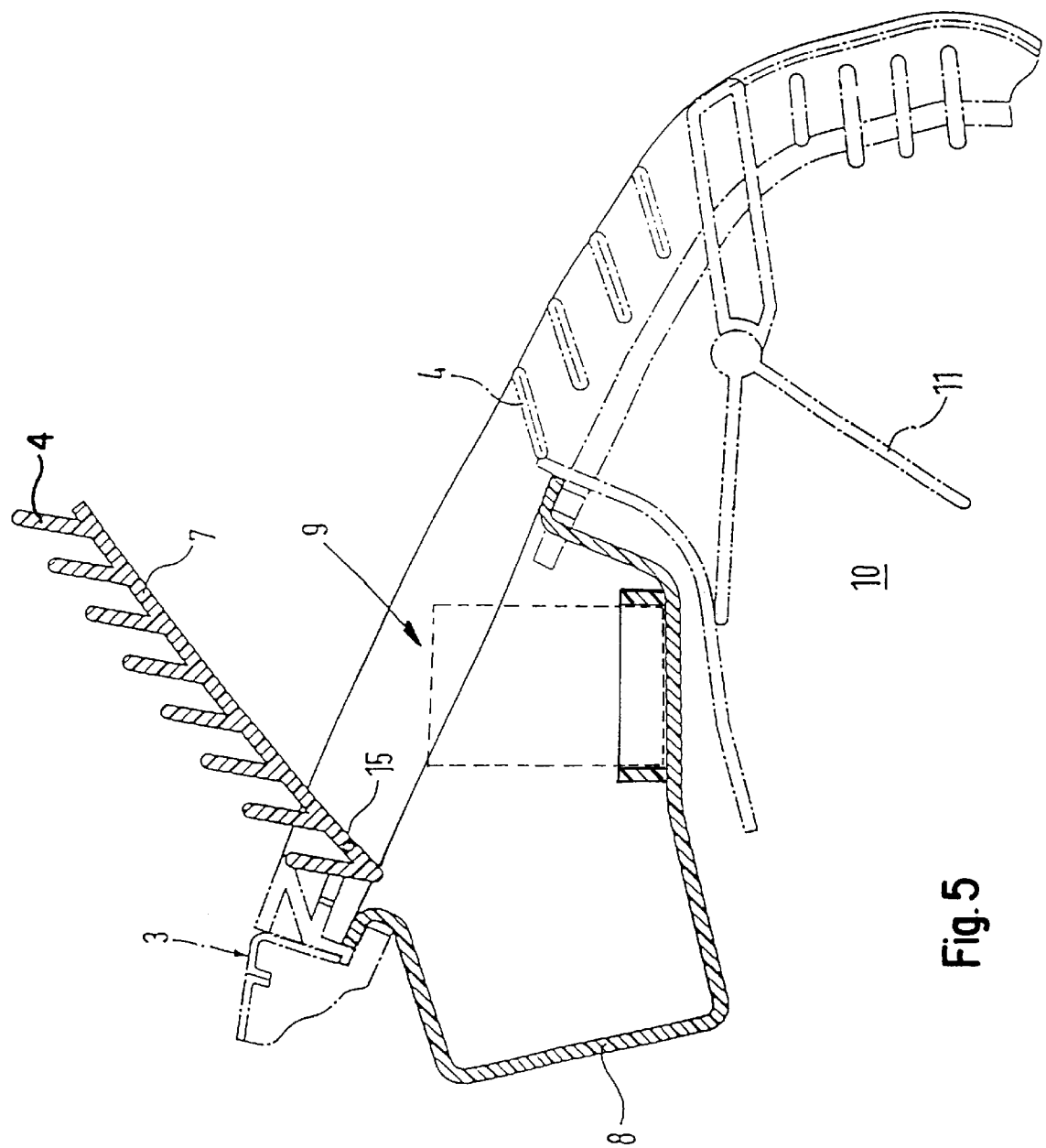

In another advantageous embodiment shown by way of example in FIGS. 4 and 5, a cup holder or beverage holder can be integrated into housing 8 of the glove compartment 9. This is a holder that serves for example to hold two glasses, cups, or cans securely in glove compartment 9 when lid 7 is open.

According to other preferred embodiments, with a suitable design of the underside of housing 8 that faces air supply 10 or with a suitable design of the transitional area between housing 8 and the air conditioner, middle nozzle 2 of this air conditioner can also serve to cool or to keep warm the beverages held in the cup holder of glove compartment 9, according to other contemplated embodiments.

Figure 6:
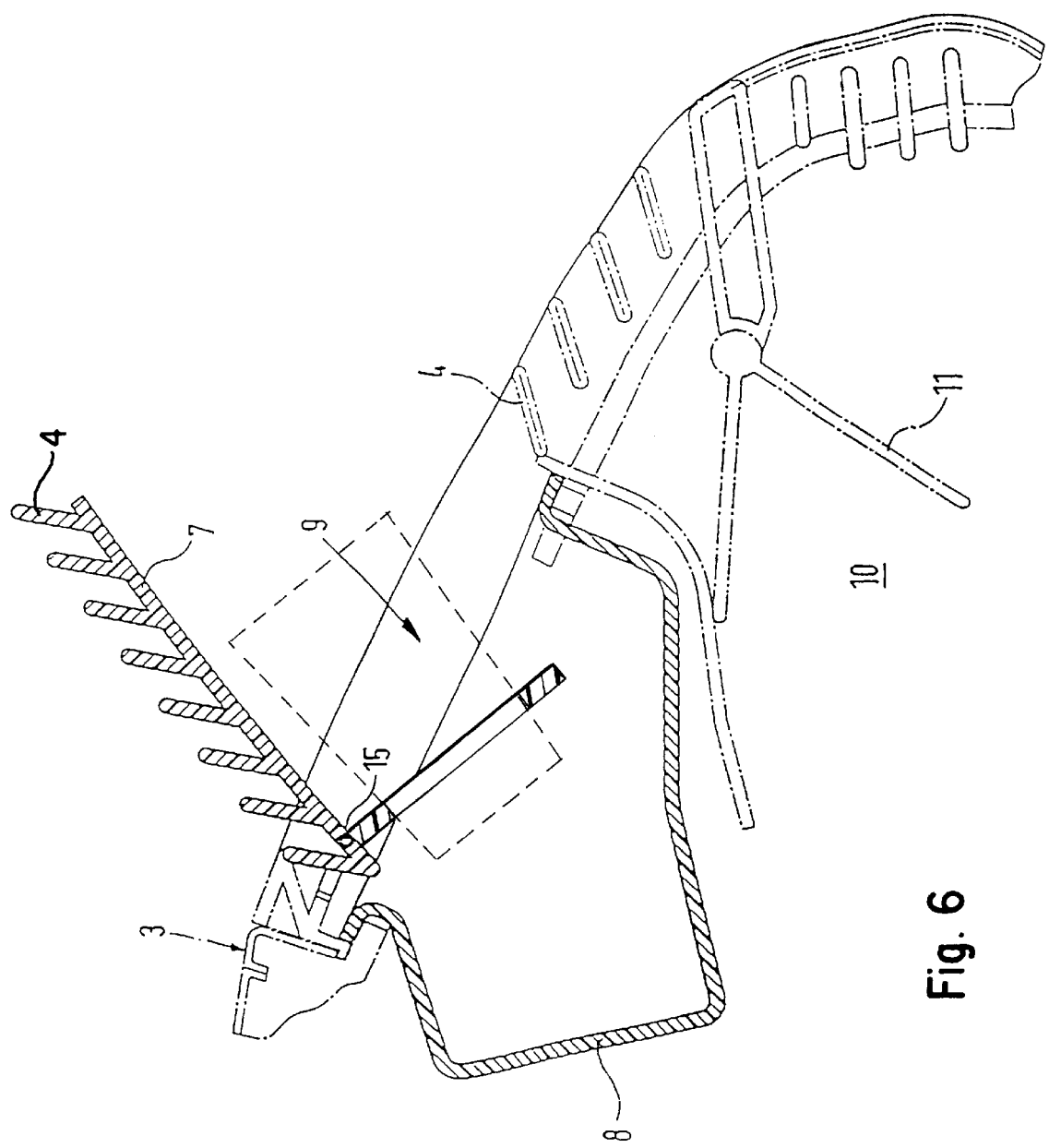
FIG. 6 is a view similar to FIG. 3 showing yet another embodiment of the invention.

Embodiments are such as that shown in FIG. 6 also contemplated where the cup holder is mounted on the interior of lid 7, for example when lid 7 is located at its lower end, instead of being at its upper end as shown. Then when lid 7 is open, its interior can serve as a support for the respective beverage container.

Embodiments are also contemplated where the lid 7 is secured by a lock L that can be operated for example by a central locking system CLS of the motor vehicle.

According to certain preferred embodiments, housing 8 and lid 7, together with frame 3, can be preassembled on middle nozzle 2 to form an unit that can be installed as a whole in instrument panel 1 during final assembly. As a result of this improvement in efficiency, final assembly is considerably simplified and can proceed more rapidly, which is especially advantageous for assembly lines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Glove compartment arrangement for an instrument panel of a motor vehicle comprising:
    a housing defining a glove compartment, and
    an air outlet nozzle of a ventilation or air conditioning device of the motor vehicle divided into a first area permitting regulation of air flow therethrough and a second area permitting non-adjustable air flow, part of one of said areas forming a lid by which said housing is made closable,
    the glove compartment forming an assembly that can be inserted with the air outlet nozzle into the instrument panel.

2. Glove compartment arrangement according to claim 1, wherein the lid and the air outlet nozzle are framed by a common frame.

3. Glove compartment arrangement according to claim 1, wherein an outside of the lid has a strip structure thereon.

4. Glove compartment arrangement according to claim 2, wherein an outside of the lid has a strip structure thereon.

5. Glove compartment arrangement according to claim 2, wherein the lid is pivotably mounted on the frame.

6. Glove compartment arrangement according to claim 3, wherein the lid is pivotably mounted on the frame.

7. Glove compartment arrangement according to claim 4, wherein the lid is pivotably mounted on the frame.

8. Glove compartment arrangement according to claim 1, wherein locking means are provided for locking the lid, especially by a central locking system of the motor vehicle.

9. Glove compartment arrangement according to claim 2, wherein locking means are provided for locking the lid, especially by a central locking system of the motor vehicle.

10. Glove compartment arrangement according to claim 3, wherein locking means are provided for locking the lid, especially by a central locking system of the motor vehicle.

11. Glove compartment arrangement according to claim 5, wherein locking means are provided for locking the lid, especially by a central locking system of the motor vehicle.

12. Glove compartment arrangement according to claim 7, wherein locking means are provided for locking the lid, especially by a central locking system of the motor vehicle.

13. Glove compartment arrangement according to claim 1, wherein at least one cup holder is integrated into the housing.

14. Glove compartment arrangement according to claim 2, wherein at least one cup holder is integrated into the housing.

15. Glove compartment arrangement according to claim 3, wherein at least one cup holder is integrated into the housing.

16. Glove compartment arrangement according to claim 4, wherein at least one cup holder is integrated into the housing.

17. Glove compartment arrangement according to claim 5, wherein at least one cup holder is integrated into the housing.

18. Glove compartment arrangement according to claim 8, wherein at least one cup holder is integrated into the housing.

19. Glove compartment arrangement according to claim 11 wherein at least one cup holder is integrated into the interior of the lid.

20. Glove compartment arrangement according to claim 2, is wherein at least one cup holder is integrated into the interior of the lid.

21. Glove compartment arrangement according to claim 3, wherein at least one cup holder is integrated into the interior of the lid.

22. Glove compartment arrangement according to claim 4, wherein at least one cup holder is integrated into the interior of the lid.

23. Glove compartment arrangement according to claim 5, wherein at least one cup holder is integrated into the interior of the lid.

24. Glove compartment arrangement according to claim 8, wherein at least one cup holder is integrated into the interior of the lid.

* * * * *